United States Patent
Veine et al.

(10) Patent No.: US 8,955,913 B2
(45) Date of Patent: Feb. 17, 2015

(54) RETRACTING AND FOLDING VEHICLE HEAD RESTRAINT

(75) Inventors: Eric Veine, Wixom, MI (US); Arjun Yetukuri, Rochester Hills, MI (US); Jasmine Pizana, Scottville, MI (US)

(73) Assignee: Lear Corporation, Southfield, MI (US)

( * ) Notice: Subject to any disclaimer, the term of this patent is extended or adjusted under 35 U.S.C. 154(b) by 645 days.

(21) Appl. No.: 13/101,201

(22) Filed: May 5, 2011

(65) Prior Publication Data

US 2012/0280547 A1 Nov. 8, 2012

(51) Int. Cl.
*B60N 2/48* (2006.01)
*B60N 2/20* (2006.01)

(52) U.S. Cl.
CPC ............ *B60N 2/4847* (2013.01); *B60N 2/4855* (2013.01); *B60N 2/4832* (2013.01); *B60N 2/4814* (2013.01)
USPC .............................. 297/408; 297/404; 297/410

(58) Field of Classification Search
USPC .................................. 297/408, 404, 410, 403
See application file for complete search history.

(56) References Cited

U.S. PATENT DOCUMENTS

| | | | |
|---|---|---|---|
| 4,935,680 A | 6/1990 | Sugiyama | |
| 4,977,973 A | 12/1990 | Takizawa | |
| 5,288,129 A * | 2/1994 | Nemoto | 297/410 |
| 5,669,668 A * | 9/1997 | Leuchtmann | 297/408 |
| 5,681,079 A * | 10/1997 | Robinson | 297/61 |
| 5,826,942 A * | 10/1998 | Sutton et al. | 297/378.12 |
| 5,906,414 A * | 5/1999 | Rus | 297/408 |
| 6,074,010 A * | 6/2000 | Takeda | 297/391 |
| 6,074,011 A * | 6/2000 | Ptak et al. | 297/408 |
| 6,709,051 B2 * | 3/2004 | Schambre et al. | 297/61 |
| 6,779,839 B2 * | 8/2004 | Andreasson et al. | 297/61 |
| 6,817,646 B2 * | 11/2004 | Kikuchi et al. | 296/65.05 |
| 7,008,019 B2 * | 3/2006 | Lampke et al. | 297/408 |
| 7,070,240 B2 * | 7/2006 | Schmitt et al. | 297/410 |
| 7,201,437 B2 * | 4/2007 | Freijy | 297/61 |
| 7,210,734 B1 * | 5/2007 | Yetukuri et al. | 297/61 |

(Continued)

FOREIGN PATENT DOCUMENTS

| | | |
|---|---|---|
| DE | 10038813 A1 | 2/2002 |
| DE | 102005005826 A1 | 8/2006 |

(Continued)

OTHER PUBLICATIONS

Chinese Office Action for corresponding Application No. 201210135220.6, mailed Mar. 3, 2014, 14 pages.

*Primary Examiner* — David R Dunn
*Assistant Examiner* — Tania Abraham
(74) *Attorney, Agent, or Firm* — Brooks Kushman P.C.

(57) ABSTRACT

A head restraint is supported by a vehicle seat assembly having a support structure including a guide. The head restraint is movable between a design position and a stowed position. The head restraint has a support member that is received in the guide, a head restraint body attached to the support member, and a locking mechanism. The support member moves with respect to the guide to translate the body with respect to the support structure. The body rotates with respect to the support member. The locking mechanism locks the body in the first or second position.

15 Claims, 4 Drawing Sheets

(56) References Cited

U.S. PATENT DOCUMENTS

| | | | |
|---|---|---|---|
| 7,484,808 B2 | 2/2009 | Yetukuri et al. | |
| 7,517,009 B2 * | 4/2009 | Mauro et al. | 297/61 |
| 7,559,608 B2 * | 7/2009 | Miyahara et al. | 297/408 |
| 7,669,932 B1 * | 3/2010 | Gronninger et al. | 297/408 |
| 7,866,754 B2 * | 1/2011 | Furukawa et al. | 297/391 |
| 7,878,596 B2 * | 2/2011 | Brunner et al. | 297/410 |
| 8,061,777 B2 * | 11/2011 | Jensen | 297/391 |
| 8,104,836 B2 * | 1/2012 | Little | 297/408 |
| 8,322,790 B2 * | 12/2012 | Tscherbner | 297/408 |
| 2003/0015898 A1 | 1/2003 | Breed | |

FOREIGN PATENT DOCUMENTS

| | | |
|---|---|---|
| DE | 102006014832 A1 | 10/2006 |
| DE | 102008025470 A1 | 3/2009 |
| DE | 102010001927 A1 | 11/2010 |
| FR | 2861342 A1 | 4/2005 |
| GB | 1202017 | 8/1970 |
| JP | 2004000373 A | 1/2004 |
| JP | 2008056088 A | 3/2008 |
| WO | 2008019502 A1 | 2/2008 |

* cited by examiner

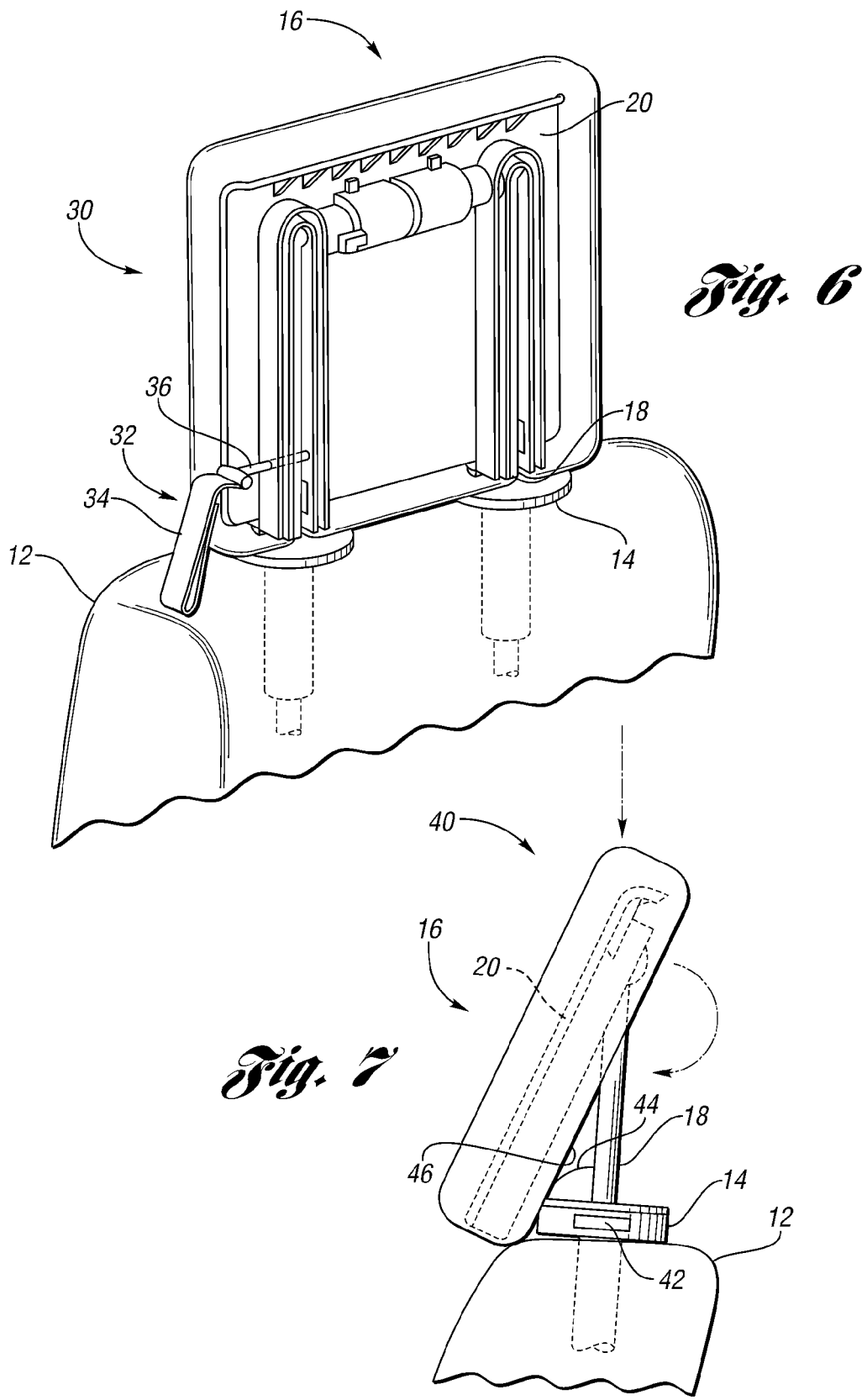

RETRACTING AND FOLDING VEHICLE HEAD RESTRAINT

TECHNICAL FIELD

The disclosure relates to a movable head restraint for use with a vehicle seat.

BACKGROUND

A vehicle seat assembly may be provided with a movable head restraint. Examples of movable head restraints are disclosed in U.S. Pat. Nos. 4,935,680, 4,977,973 and 7,484,808.

SUMMARY

A head restraint is provided for use with a vehicle seat assembly. The vehicle seat assembly has a support structure including a guide. The head restraint is supported by the support structure and is movable between a design position and a stowed position. The head restraint has a support member that is received in the guide. A head restraint body is attached to the support member. A locking mechanism is associated with the head restraint body. The support member is movable with respect to the guide to translate the head restraint body with respect to the support structure. The head restraint body is rotatable with respect to the support member between a first position and a second position. The locking mechanism is configured to lock the head restraint body in one of the first position and second position. The head restraint body is translated away from the support structure and is rotated to the first position to place the head restraint in the design position. The head restraint body is rotated to the second position and is translated toward the support structure to place the head restraint in the stowed position.

BRIEF DESCRIPTION OF THE DRAWINGS

FIG. 6 is a perspective view of a vehicle seat assembly according to another embodiment and including a seat back and a head restraint mounted on the seat back, the head restraint illustrated in a design position;

FIG. 7 is a perspective view of a vehicle seat assembly according to yet another embodiment and including a seat back and a head restraint mounted on the seat back, the head restraint illustrated during the stowing process;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
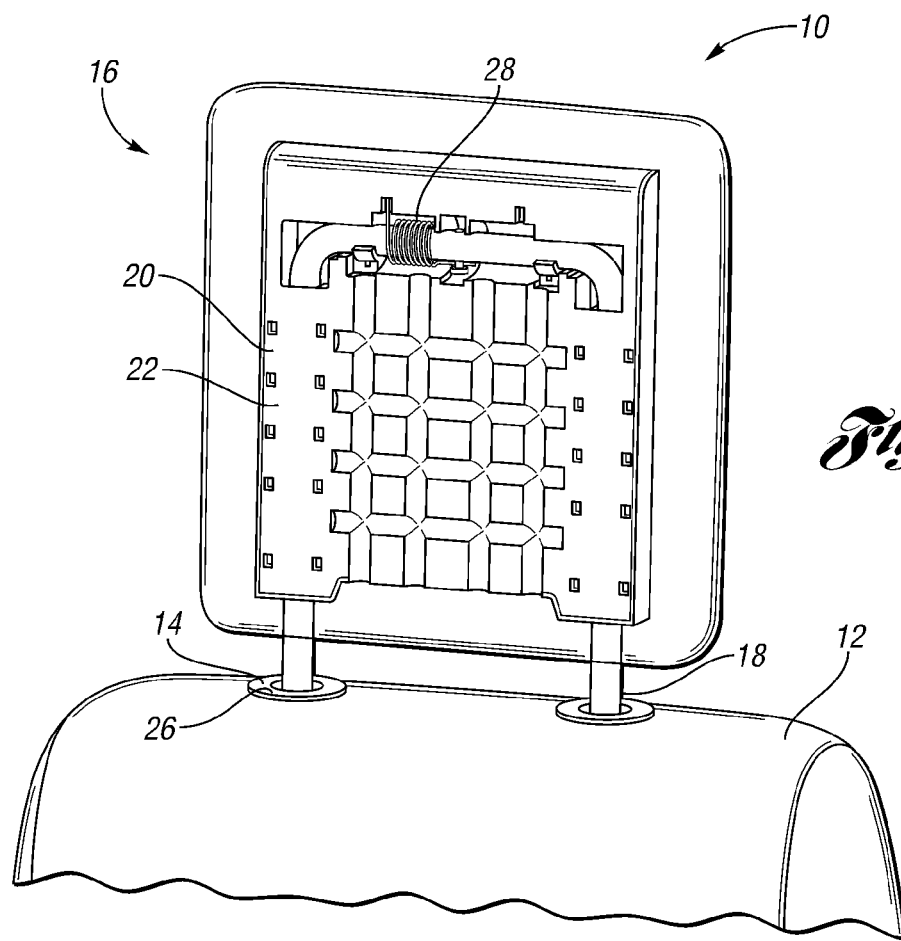
FIG. 1 is a perspective view of a vehicle seat assembly according to the present disclosure and including a seat back and a head restraint mounted on the seat back.
Figure 3:
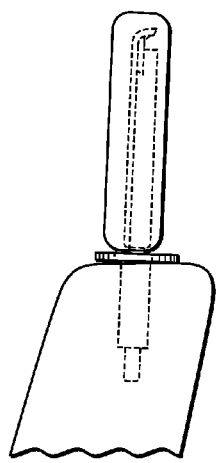
FIG. 3 is a side view of the vehicle seat assembly of FIG. 1 illustrating the head restraint in a design position.
Figure 5:
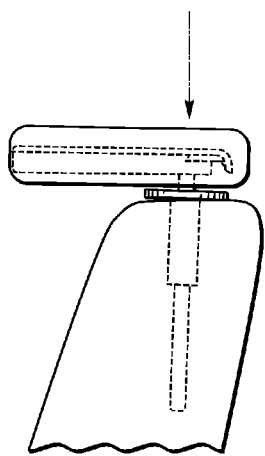
FIG. 5 is a side view of the vehicle seat assembly of FIG. 1 illustrating the head restraint in a stowed position.

FIG. 1 illustrates a vehicle seat assembly 10. The seat assembly 10 has a support structure 12, such as a seatback, which includes a pair of guides 14. Although a pair of guides 14 are shown, any number of guides are contemplated, such as a single guide 14 or more than two guides 14. The support structure 12 supports a head restraint 16 which has a pair of support members 18, such as support rods or posts. Each support member 18 slides into a respective guide 14 and allows the head restraint to translate with respect to the seatback 12. The head restraint is movable between a design position (or use position) and a stowed position. In the design position, the head restraint is in a generally vertical orientation (as shown in FIGS. 1 and 3), where it supports the head of a vehicle occupant, for example, when the vehicle occupant is in the vehicle seat assembly 10 or during an accident. In the stowed position, the head restraint is folded and translated toward the seatback 12, as shown in FIG. 5. The stowed position may be used to improve driver visibility when the vehicle seat 12 is unoccupied, or to facilitate stowage of the vehicle seat assembly 10 in a folded orientation or when there is cargo that is overlying the vehicle seat assembly 10. By stowing the head restraint 16 as shown in FIG. 5, driver visibility is improved to the rear of the vehicle by not having the head restraint 16 acting as an obstruction to the driver's visibility. The head restraint 16 is shown in FIGS. 3 and 5 as being between the design and stowed positions.

The guides 14 have an assembly 26 which allows locking with the guides 14 to locate or position the head restraint 16 at a desired height and/or to prevent the head restraint 16 from being removed from the seatback 12 or traveling beyond a fully raised position. The assembly 26 may be any suitable assembly used for locking the head restraint 16 to the vehicle seatback 12 such as any assembly known in the art.

The head restraint 16 has a head restraint body 20 which is connected to the support members 18. The head restraint body 20 may include a substrate 22 that is covered with a foam cushion or other padding material, which in turn may be covered with a fabric, leather, or other similar material to act as cushioning and trim for the head restraint 16. The head restraint body 20 is pivotally connected to the support members 18 such that it may be rotated with respect to the support members 18 between a first position shown in FIG. 3, and a second position shown in FIG. 5. In, the first position shown in FIG. 3, the head restraint 16 is oriented at zero degrees with respect to the support members 18 or a vertical axis. The head restraint 16 as shown in FIG. 5 is in the second position and oriented at approximately ninety degrees with respect to the support members 18 or a vertical axis.

The head restraint 16 also has a locking mechanism 24 associated with the head restraint body 20. The locking mechanism 24 may be configured to lock the head restraint body 20 in the first position and/or the second position.

The locking mechanism 24 locks the substrate 22 to the support members 18 by the substrate 22 having a friction fit against the support members 18. For example, the substrate 22 may have a receiving piece with a smaller dimension than the support member 18, thereby causing the support member to be snapped into and retained by the receiving piece. The substrate 22 may also have attachment features or fasteners such as snaps, or the like, to lock the substrate 22 in place with respect to the support members 18. The fasteners may be part of the locking mechanism 24, or be an additional fastening assembly. For example, if the head restraint 16 is in a design position as shown in FIG. 3, in order to stow the head restraint 16, the user unlocks the substrate 22 from the support members 18 either by imparting a force to overcome the frictional resistance and/or by unsnapping or unfastening the substrate 22. The head restraint body 20 is then rotated from the first position shown in FIG. 3 to the second position in FIG. 5.

Figure 2:
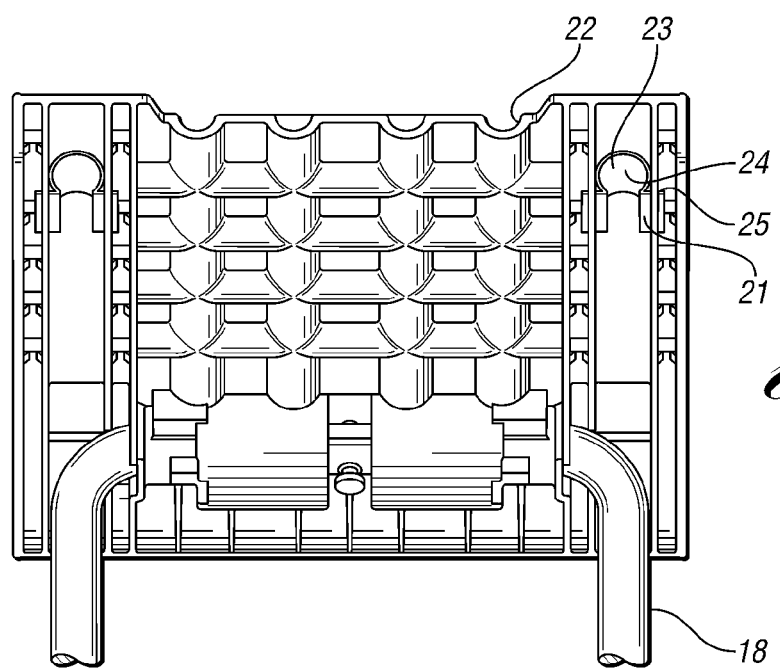
FIG. 2 a perspective view showing the head restraint of FIG. 1 during the stowing process.

The locking mechanism 24, as shown in FIG. 2, may have a pair of tabs 21 extending from a generally cylindrical section 23. The cylindrical section 23 is sized to fit about one of the support members 18 to retain the head restraint 16 in the use position. The tabs 21 are inserted into slots 25 formed in the substrate 22. The cylindrical section 23 expands and deforms during the process of being attached to or detached from the support member 18, which in turn causes the tabs 21 to slide through the slots 25. The tabs 21 sliding motion lowers the force needed to attach or detach the locking mechanism 24 from the support member 18, and may additionally increase the lifetime and number of use cycles for the mechanism 24. Alternatively, the tabs 21 have a curved profile and extend from the cylindrical section 23 to hook under a plastic lip molded in the substrate 22 to retain the mechanism 24, and also allow for a flexing motion for locking/unlocking the mechanism 24 about the support members 18. Of course, other mechanisms are also contemplated as are known in the art where the tabs 21 are connected to the substrate 22 such the mechanism 24 is retained and can also flex or deform about a support member 18.

Figure 4:
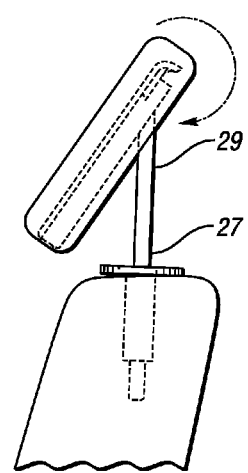
FIG. 4 is a side view of the vehicle seat assembly of FIG. 1 illustrating the head restraint during the stowing process.

FIG. 4 depicts rotating the head restraint body 20 with respect to the support members 18 and the vehicle seatback 12. The head restraint 16 is rotated and translated down into the seatback 12 during this process. The rotation may occur before, during or after the translation in various embodiments. The head restraint 16 may have sufficient weight to drop into the seatback 12 due to gravity, or the user or a mechanism may impart a force to the head restraint 16 to cause the translation. The support members 18 slide with respect to the guides 14 to translate the head restraint 16 towards the vehicle seatback 12. The head restraint 16 may translate down until it is contacting the vehicle seatback or alternatively there may be a notch or other stop mechanism on the support member 18 at a lowered position.

The support member 18 shown in FIG. 4 has a set of notches 27, 29 that are spaced apart from one another along the length of the support member 18. The notches 27, 29 engage the guide 14 to hold the head restraint in either the raised position or lowered position. Other notches along the support member 18 are also contemplated to position the head restraint 16 at different heights to accommodate different users of the vehicle seat assembly 10.

To raise the head restraint 16 from the stowed position to the design position, the head restraint 16 is raised with respect to the seatback 12 until it reaches a raised position. There may be a notch or stop mechanism in the support members 18 to engage the guides 14 at the raised position. The head restraint 16 is rotated from the second position to the first position. The user may impart a force on the head restraint 16 to rotate the head restraint 16, or alternatively, the head restraint 16 may have a spring component 28 which causes the head restraint 16 to automatically rotate from the second position to the first position. In alternative embodiments, the spring 28 may be positioned such that it biases the head restraint 16 from the design position shown in FIG. 3 towards the stowed position shown in FIG. 5. The spring 28 or biasing mechanism may extend between one or both of the support members 18 and the head restraint body 20 causing the head restraint body 20 to be biased toward either the first position or the second position based on the positioning of the spring 28. The substrate 22 is then locked to the support members 18 using the locking mechanism 24.

The head restraint body 20 as shown in FIGS. 1-5 rotates or pivots through approximately ninety degrees between the first position and the second position. Of course, any number of degrees of rotation for the head restraint body 20 are also contemplated. For example, the head restraint 16 could travel through approximately sixty degrees between the first position and second position.

FIG. 6 shows another embodiment of a vehicle seat assembly 30 according to the present disclosure. Elements of the vehicle seat assembly 30 which are similar to those described previously with respect to FIGS. 1-5 have the same reference numerals. The vehicle seat assembly 30 operates similarly to that shown in FIGS. 1-5 between a design position and a stowed position as shown in FIGS. 3 and 5. A locking mechanism 32 locks the head restraint 16 in either the first position (as shown) or when released, allows the head restraint body 16 to rotate to the second position. The locking mechanism 32 is manually operated by a user of the vehicle and may be a strap and pin, a quick release clamp, or another mechanism as it is known in the art. The locking mechanism 32 may have a strap 34 attached to a pin 36, which is inserted into the body 20 and support members 18 to retain the head restraint 16 in the use position. The strap 34 moves the pin 36 such that it disengages the head restraint body 20 from the support members 18, thereby allowing it to pivot. Alternatively, locking mechanism 32 may operates as a quick release clamp such that when a lever arm 34 of the quick release clamp is rotated, a cam surface on the lever 34 rotates with respect to a pin 36 thereby shortening the usable length of the pin 36 and creating a tension fit to lock the head restraint body 20.

Another vehicle seat assembly 40 is shown in FIG. 7 according to the present disclosure. Elements of the vehicle seat assembly 40 which are similar to those described previously with respect to FIGS. 1-5 have the same reference numerals. The vehicle seat assembly 40 operates similarly to that shown in FIGS. 1-5 between a design position and a stowed position as shown in FIGS. 3 and 5.

A ramp 44 extends from the guides 18. A corresponding cam surface 46 is located on the head restraint body 20. The ramp 44 and cam surface 46 are positioned to engage one another to rotate the head restraint body 20 as the head restraint 16 is moved between the design position and the stowed position. Although the ramp 44 is shown as being connected to the guides 14 with the corresponding cam surface 46 on the head restraint body 20, in alternative embodiments, the cam surface 46 may be located on the guides 14 and the ramp 44 may be located on the head restraint body 20. The ramp 44 may be integrally formed with the supporting structure, such as the guides 14, or may be a separate part which is either insert molded or snapped onto the supporting structure.

The stowing process is shown in FIG. 7. The release mechanism 42 is pressed by a user. This unlocks the support members 18 from the guides 14. The support members 18 retract into the seatback 12. The cam surface 46 interacts with the ramp 44, thereby causing the head restraint body 20 to rotate and avoid interference with the top of the seatback 12. The head restraint 16 rotates up to ninety degrees although other ranges or motion such as sixty degrees are also contemplated. To raise the head restraint 16 from the stowed position to the design position, the release mechanism 42 may be pressed again to unlock the support members 18 from the guides 14, and the head restraint 16 is raised until a notch or other feature on the support members 18 locks against the guides 14 in the design position. A spring mechanism (not shown) may be provided in the head restraint 16 to automatically rotate the head restraint back to the design position or zero degree of the first position orientation.

Figure 8:
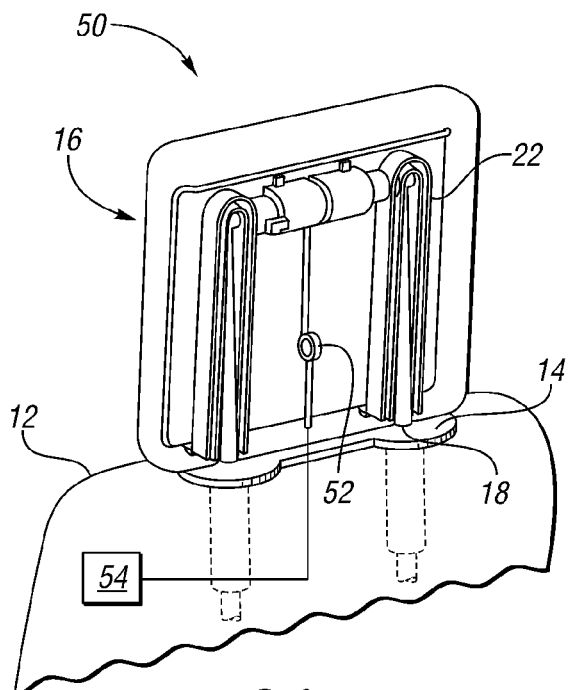
FIG. 8 is a perspective view of a vehicle seat assembly according to another embodiment and including a seat back and a head restraint mounted on the seat back, the head restraint illustrated in a design position.
Figure 9:
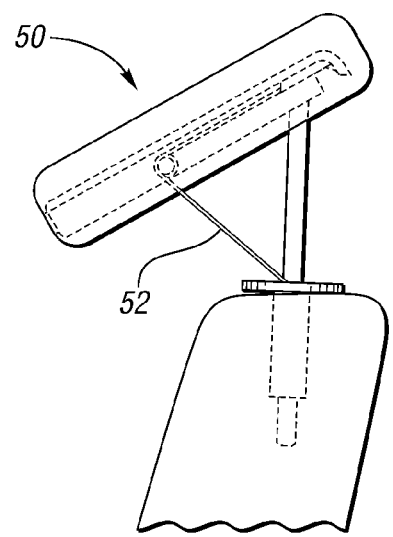
FIG. 9 is a side view of the vehicle seat assembly of FIG. 8 illustrating the head restraint during the stowing process.

Another embodiment of a vehicle seat assembly 50 according to the present disclosure is shown in FIGS. 8-9. Elements of the vehicle seat assembly 50 which are similar to those described previously with respect to FIGS. 1-5 have the same reference numerals. The vehicle seat assembly 50 operates similarly to that shown in FIGS. 1-5 between a design position and a stowed position as shown in FIGS. 3 and 5. A biasing member 52, such as a torsion spring, connects the substrate 22 to an upper region of the guide 14 or seatback 12. The biasing member 52 acts to rotate the head restraint 16 from the first position to the second position to place the vehicle seat assembly 50 in one of the design position and stowed position.

FIG. 9 shows the head restraint 16 being rotated by the biasing member 52 as it goes from the design position to the stowed position, or vice versa. In some embodiments, the biasing member 52 is connected to a seat mechanism 54. The seat mechanism 54 acts to fold the seatback 12 or unfold the seatback 12 with respect to a seat bottom of the seat assembly 50. For example, if a user engages the seat mechanism 54, the biasing member 52 moves to rotate the head restraint 16. The head restraint 16 is then retracted into the seat 12 and the head restraint 16 rests on or near the top of the seatback 12 at approximately a ninety degree angle, for example. To place the head restraint 16 into the design position, the seatback 12 is unfolded to an upright position. The head restraint assembly 16 is translated away from the seatback 12, and the biasing member 52 rotates the head restraint 16 back into the first position, such that the vehicle seat assembly 50 is placed in the design position. The seat mechanism 54 may include an actuator which is connected to both the support structure 12 and the head restraint 16 causing the head restraint 16 to translate with respect to the support structure 12. The mechanism 54 may also include a seat folding mechanism, which may be manually actuated by a user or actuated by an actuator, as is known in the art.

Figure 10:
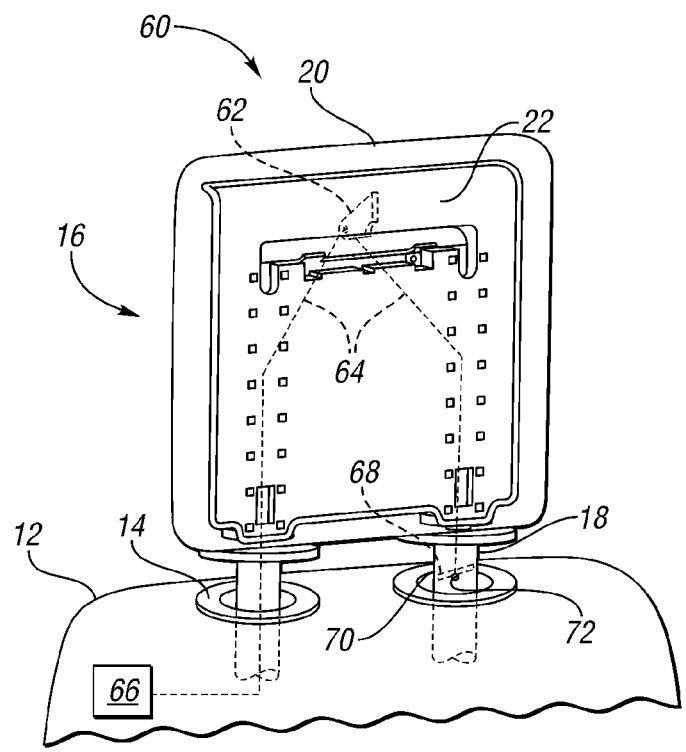
FIG. 10 is a perspective view of a vehicle seat assembly according to yet another embodiment and including a seat back and a head restraint mounted on the seat back, the head restraint illustrated in a design position.

FIG. 10 depicts another embodiment of a vehicle seat assembly 60 according to the present disclosure. Elements of the vehicle seat assembly 60 which are similar to those described previously with respect to FIGS. 1-5 have the same reference numerals. The vehicle seat assembly 60 operates similarly to that shown in FIGS. 1-5 between a design position and a stowed position as shown in FIGS. 3 and 5. A release mechanism 66, such as a push button, allows the support members 18 to slide with respect to the guides 14, and permits the head restraint 16 to translate with respect to the vehicle seatback 12. The body of the head restraint 20 is rotatably connected to the support members 18.

A lever arm 62 extends from a surface of the substrate 22. A cable 64 travels from a user access point 66, up through one of the support members 18, to the lever arm 62 attached to the substrate 22, back through the other support member 18, and to a wedge 68. The user access point 66 could be a seat recline mechanism, a strap accessible by the user, or other mechanism as is known in the art. A locking blade 70 extends from the guide 14 inward towards the support member 18. The locking blade 70 engages an aperture 72 in the support member 18 to lock the head restraint 16 in place with respect to the seatback 12. When the user access point 66 is activated, for example when the user is reclining the seat, unfolding the seat, or engaging the strap to fold the head restraint itself, the cable 64 is pulled by the access point 66. The wedge 68 interacts with the locking blade 70 to push the locking blade 70 out of the aperture 72, thereby unlocking the support member 18 from the guide 14. As the cable 74 continues to travel, the lever arm 62 causes the head restraint body 20 to pivot or rotate with respect to the support members 18 which causes the head restraint body 20 to rotate from the first position towards the second position. The cable 74 exits the support members 18 below the pivot point of the head restraint 16 and below the lever arm 62. The head restraint 16 is pulled down into the seatback 12 and the stowing process ends with the head restraint 16 in the stowed position adjacent to the seatback 12. To place the head restraint 16 back into a design position, the head restraint 16 is manually raised and rotated to the design position, wherein the locking blade 70 engages the aperture 72 in the support member 18.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat assembly comprising:
   a support structure including a guide; and
   a head restraint supported by the support structure and being movable between a design position and a stowed position, the head restraint including a support member that is received in the guide, a head restraint body attached to the support member, and a locking mechanism associated with the head restraint body, the support member being movable with respect to the guide to translate the head restraint body with respect to the support structure, the head restraint body being rotatable with respect to the support member between a first position and a second position, and the locking mechanism being configured to lock the head restraint body in one of the first position and second position;
   wherein the head restraint body defines a slot;
   wherein the locking mechanism includes a tab, the tab sized to be received in the slot;
   wherein the locking mechanism has a deformable sleeve section sized to fit about one of the support members when the locking mechanism is engaged with the support member, the tab extending outwardly from the section; and
   wherein the locking mechanism is connected to the head restraint body such that the tab slides with respect to the slot as the locking mechanism engages or disengages the support member.

2. The vehicle seat assembly of claim 1 wherein the head restraint body is translated away from the support structure and is rotated to the first position to place the head restraint in the design position; and
   wherein the head restraint body is rotated to the second position and is translated toward the support structure to place the head restraint in the stowed position.

3. The vehicle seat assembly of claim 1 further comprising a biasing mechanism extending between the support member and the head restraint body to bias the head restraint body towards the first position.

4. The vehicle seat assembly of claim 1 further comprising a biasing mechanism extending between the support member and the head restraint body to bias the head restraint body towards the second position.

5. The vehicle seat assembly of claim 1 wherein the head restraint body pivots at least sixty degrees between the first position and the second position.

6. The vehicle seat assembly of claim 1 wherein the head restraint body pivots approximately ninety degrees between the first position and the second position.

7. The vehicle seat assembly of claim 1 wherein the locking mechanism comprises a snap.

8. The vehicle seat assembly of claim 1 wherein the support member has a first notch to locate the head rest in the upright design position; and
wherein the support member has a second notch spaced apart from the first notch, the second notch being configured to locate the head rest in the stowed position.

9. The vehicle seat assembly of claim 1 wherein the head restraint body includes a substrate and a cushion extending from the substrate.

10. The vehicle seat assembly of claim 1 further comprising a biasing member connecting an upper portion of the head restraint body to the support structure, wherein the biasing member rotates the head restraint body as the head restraint body is translated.

11. The head restraint body of claim 1 wherein the head restraint body defines another slot;
wherein the locking mechanism includes another tab sized to be received in the another slot; and
wherein the another tab slides with respect to the another slot as the locking mechanism engages or disengages the support member.

12. The head restraint body of claim 1 wherein the sleeve section is generally cylindrical.

13. A vehicle seat assembly comprising:
a support structure including a pair of guides; and
a head restraint supported by the support structure and being movable between a design position and a stowed position, the head restraint having a pair of support members received in the guides, a head restraint body connected to the pair of support members, and a locking mechanism having a generally cylindrical section with a pair of tabs extending outwardly therefrom to support the locking mechanism on the head restraint body, the head restraint body rotatable with respect to the support members between a first position and a second position, the locking mechanism being configured to lock the head restraint body in one of the first position and the second position, wherein the tabs move with respect to the head restrain body such that the generally cylindrical section has a flexing motion as the locking mechanism engages or disengages the support member;
wherein the head restraint body is rotated to the second position and the head restraint body is translated towards the support structure to place the head restraint in the stowed position; and
wherein the head restraint body is translated away from the support structure and the head restraint body is rotated to the first position to place the head restraint in the design position.

14. The head restraint body of claim 13 wherein the head restraint body defines a pair of slots, each slot receiving one of the pair of tabs to support the first portion of the locking mechanism, wherein the tabs slide with respect to the slots as the locking mechanism engages or disengages the support member.

15. A vehicle seat assembly comprising:
a support structure including a guide;
a head restraint supported by the support structure and being movable between a design position and a stowed position, the head restraint including a support member that is received in the guide, a head restraint body attached to the support member, and a locking mechanism associated with the head restraint body, the support member being movable with respect to the guide to translate the head restraint body with respect to the support structure, the head restraint body being rotatable with respect to the support member between a first position and a second position, and the locking mechanism being configured to lock the head restraint body in one of the first position and second position; and
a biasing member connecting an upper portion of the head restraint body to the support structure, wherein the biasing member rotates the head restraint body as the head restraint body is translated;
wherein the head restraint body defines a slot;
wherein the locking mechanism includes a tab, the tab sized to be received in the slot; and
wherein the locking mechanism is connected to the head restraint body such that the tab slides with respect to the slot as the locking mechanism engages or disengages the support member.

* * * * *